United States Patent [19]

Matsubayashi

[11] Patent Number: 4,637,094
[45] Date of Patent: Jan. 20, 1987

[54] APPARATUS FOR COLLECTING FLESH OF FISH

[75] Inventor: Kaneo Matsubayashi, Kishiwada, Japan

[73] Assignees: Toyo Suisan Kikai Co. Ltd.; Taiyo Fishery Co. Ltd., both of Japan

[21] Appl. No.: 732,631

[22] Filed: May 10, 1985

[30] Foreign Application Priority Data

May 12, 1984 [JP] Japan .................................. 59-94993

[51] Int. Cl.⁴ ...................... A22C 17/00; A22C 25/00
[52] U.S. Cl. ..................................... 17/1 G; 241/69; 241/76; 241/84.2; 241/85; 241/167
[58] Field of Search .................. 17/21, 49, 50, 53, 55, 17/59, 62, 1 G, 46; 241/69, 76, 84.2, 85, 167, 200; 222/290

[56] References Cited

U.S. PATENT DOCUMENTS 1,143,135 6/1915 Rathbun ............................ 241/85 X
1,327,254 1/1920 Remmers ......................... 241/85 X
3,356,119 12/1967 Kirkpatrick et al. ................. 241/85
3,829,931 8/1974 Suerbaum ........................... 17/46 X

FOREIGN PATENT DOCUMENTS 965297 4/1975 Canada .................................. 17/1 G
701176 12/1953 United Kingdom ................ 241/200
2093331 9/1982 United Kingdom ..................... 17/46

Primary Examiner—Willie G. Abercrombie
Attorney, Agent, or Firm—Larson & Taylor

[57] ABSTRACT

An apparatus for collecting the flesh of fish comprising an endless belt for conveying a material and two rotatable hollow rolls for collecting the flesh of fish each having a multiplicity of flesh collecting holes in its peripheral wall and being closed at its one end and open at the other end thereof, the two collecting rolls being spaced apart by a distance in the direction of movement of the endless belt and held in pressing contact with the surface of the belt by separate contact pressure adjusting means individually, a scraping knife being disposed at the rear side of each collecting roll and adapted for sliding contact with the peripheral surface of the collecting roll.

3 Claims, 4 Drawing Figures

APPARATUS FOR COLLECTING FLESH OF FISH

BACKGROUND OF THE INVENTION

Apparatus of various types have heretofore been proposed and used for collecting the flesh of fish as removed from the skin by grinding or mashing to obtain a material for processed fish products such as sausage, boiled fish paste, etc. For example, an apparatus of the following construction is known for collecting the flesh of fish.

This apparatus comprises a hollow flesh collecting roll having a multiplicity of flesh collecting holes in its peripheral wall and a material conveyor belt in pressing contact with the roll. Flesh pieces having the skin still attached thereto and obtained by removing opposite side flesh portions of fish bodies from the bone are fed between the roll and the belt while rotating the roll and driving the belt to separate the flesh portions from the skin by grinding and collect the flesh within the roll through the holes.

Generally the flesh of fish includes flesh of low quality adjacent to the skin and underlying flesh of good quality. The above collecting apparatus has the following drawbacks because it has only one collecting roll in pressing contact with the belt.

When the pressure between the collecting roll and the belt is increased to collect flesh in a high yield, flesh of good quality and flesh of low quality are collected at the same time, so that the flesh collected is not suited as a material for preparing processed fish products of high quality. However, if the pressure is decreased to obtain flesh of good quality only, flesh of good quality is partly left unremoved along with flesh of poor quality which remains as attached to the skin to result in a low yield, hence uneconomical.

SUMMARY OF THE INVENTION

The present invention relates to improvements in the apparatus of the type described for collecting the flesh of fish, and more particularly to an apparatus for collecting the flesh of fish which comprises the combination of two flesh collecting rolls and one material conveyor belt.

The main object of the present invention is to provide an apparatus for collecting the flesh of fish which comprises two flesh collecting rolls by which flesh of good quality and flesh of low quality can be collected separately and efficiently by a continuous operation to achieve improved yields.

Another object of the present invention is to provide an apparatus for collecting the flesh of fish wherein the contact pressure between each collecting roll and a conveyor belt is adjustable to collect flesh portions of different qualities separately with high reliability.

To fulfill the above objects, the present invention provides an apparatus for collecting the flesh of fish comprising an endless belt for conveying a material and two rotatable hollow rolls for collecting the flesh of fish each having a multiplicity of flesh collecting holes in its peripheral wall and being closed at its one end and open at the other end thereof, the two collecting rolls being spaced apart by a distance in the direction of movement of the endless belt and held in pressing contact with the surface of the belt by separate contact pressure adjusting means individually, a scraping knife being disposed at the rear side of each collecting roll and adapted for sliding contact with the peripheral surface of the collecting roll.

With the apparatus of the above construction, the contact pressure between the belt and each of the two collecting rolls is adjusted to the desired value by the pressure adjusting means concerned. The rolls and the belt are then driven, and pieces of flesh of fish having the skin thereon, obtained by separating opposite side flesh portions of fish bodies from the bone, are fed between the first of the rolls and the belt. With the skin in contact with the belt surface, flesh of good quality along is collapsed by friction or ground, and is forced off the fish pieces and collected in the first roll through the collecting holes. The remaining flesh portions with the skin are moved with the roll as attached to the roll surface, scraped off the the knife and fall onto the belt. Subsequently these flesh pieces are fed between the second collecting roll and the belt, whereby flesh of low quality is collapsed by friction and pressure or ground and collected in the second roll through the holes.

According to the present invention, therefore, the flesh of good quality and the flesh of low quality can be separately collected from the starting flesh pieces. Thus, the apparatus is convenient for obtaining a material for processed fish products of high quality and a material for processed fish products of low quality, while the flesh of fish can be collected without waste to achieve a greatly improved yield.

Further according to the invention, flesh of different qualities can be collected efficiently by a continuous operation.

DESCRIPTION OF THE PREFERRED EMBODIMENT

Figure 1:
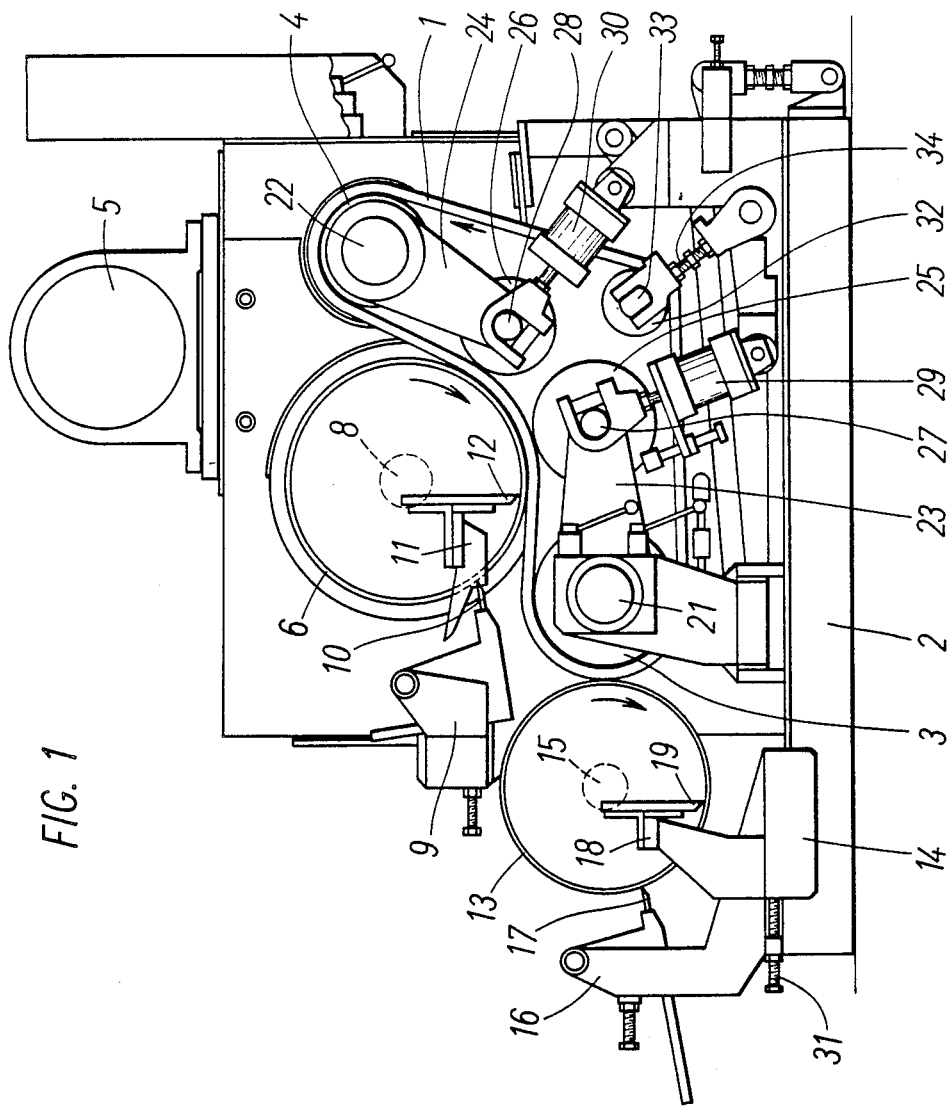
FIG. 1 is a side elevation showing a preferred embodiment of the invention.
Figure 2:
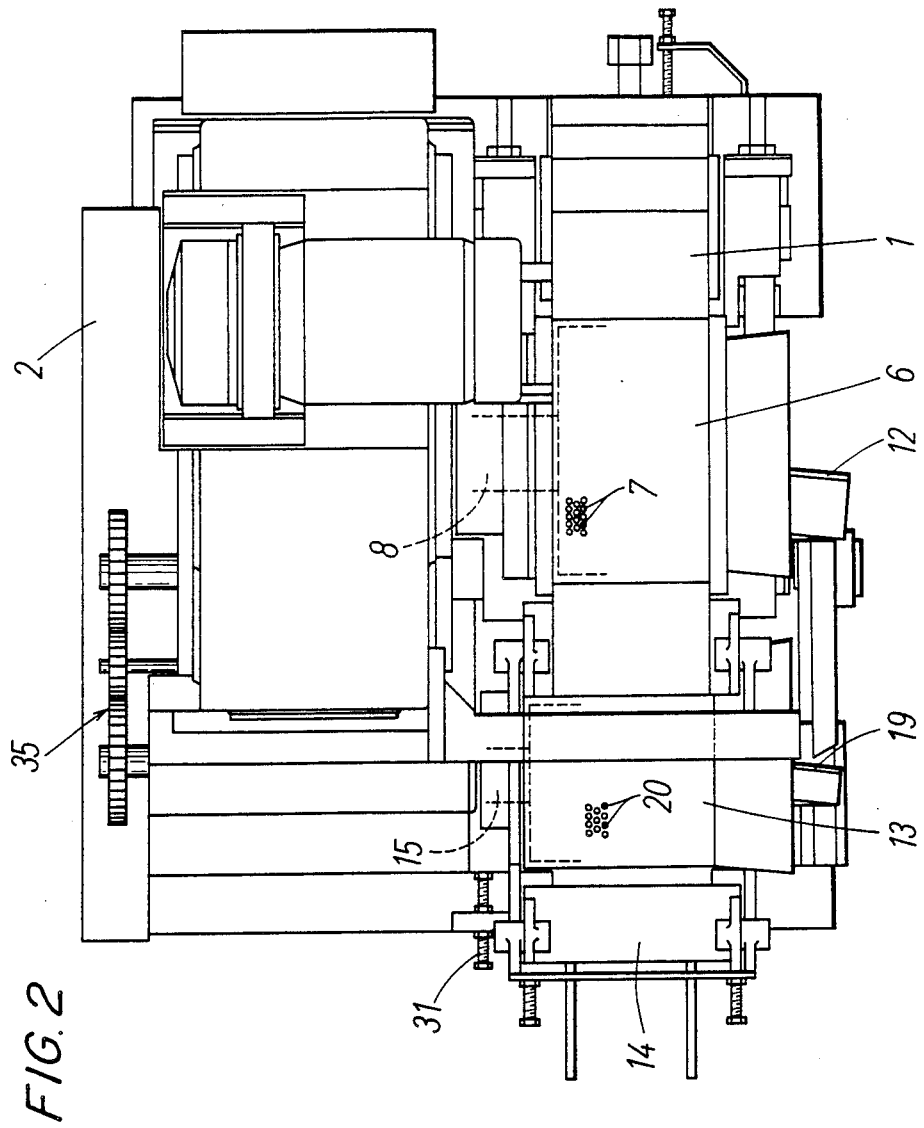
FIG. 2 is a plan view of the same.
Figure 3:
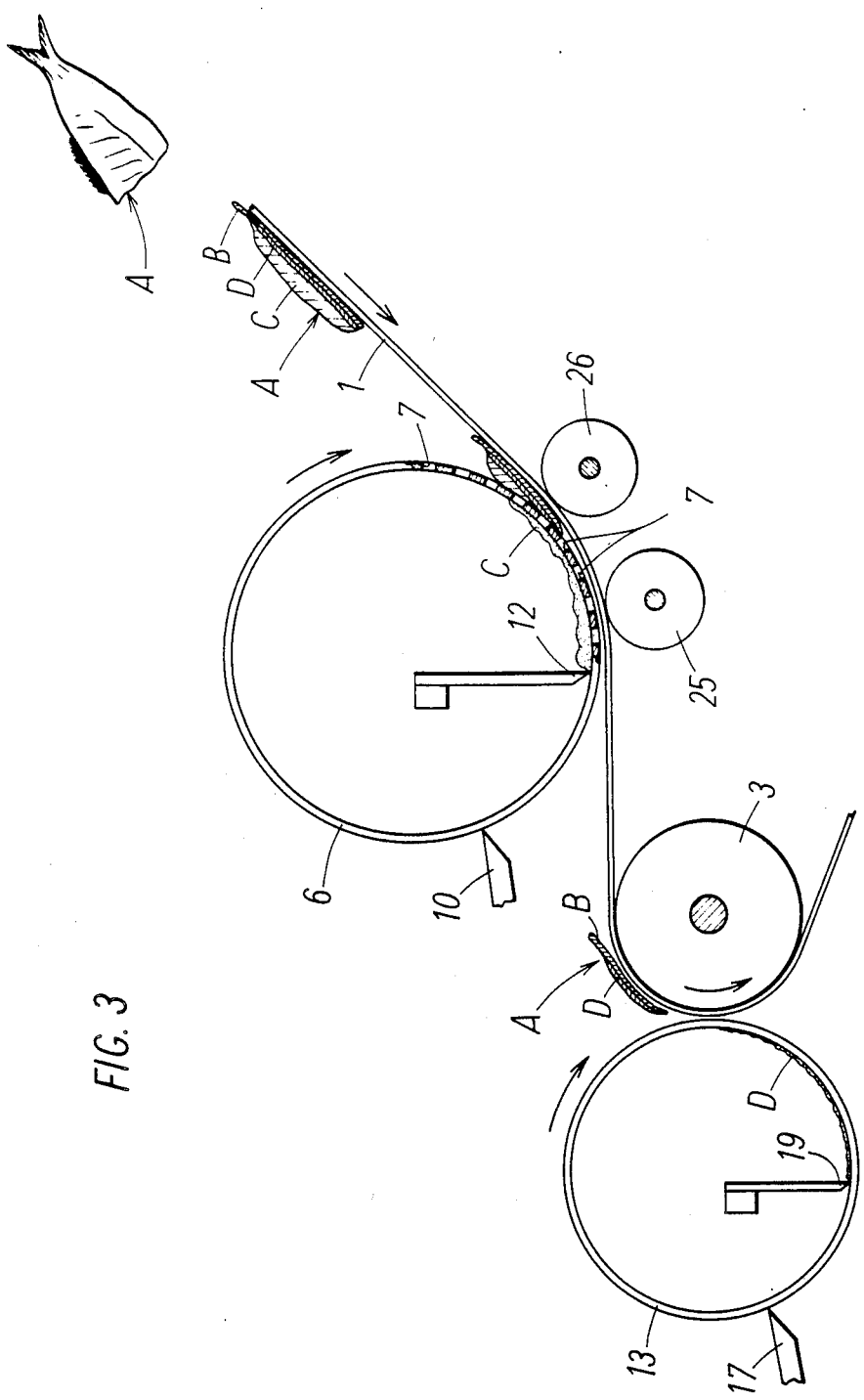
FIG. 3 is a diagram showing how flesh is collected.

The apparatus of the present invention for collecting the flesh of fish generally comprises an endless belt for conveying a material, first and second flesh collecting rolls spaced apart from each other in the direction of movement of the belt and arranged in pressing contact with the surface of the belt, means for adjusting the pressure of contact between the belt and the first collecting roll and means for adjusting the pressure of contact between the belt and the second collecting roll.

The material conveying endless belt 1 is reeved around a drive roll 3 and a driven roll 4 which are mounted on a frame 2 and spaced apart by a required distance longitudinally of the apparatus. The drive roll 3 is rotated by a motor 5 through suitable transmission means (not shown) to drive the belt 1.

Figure 4:
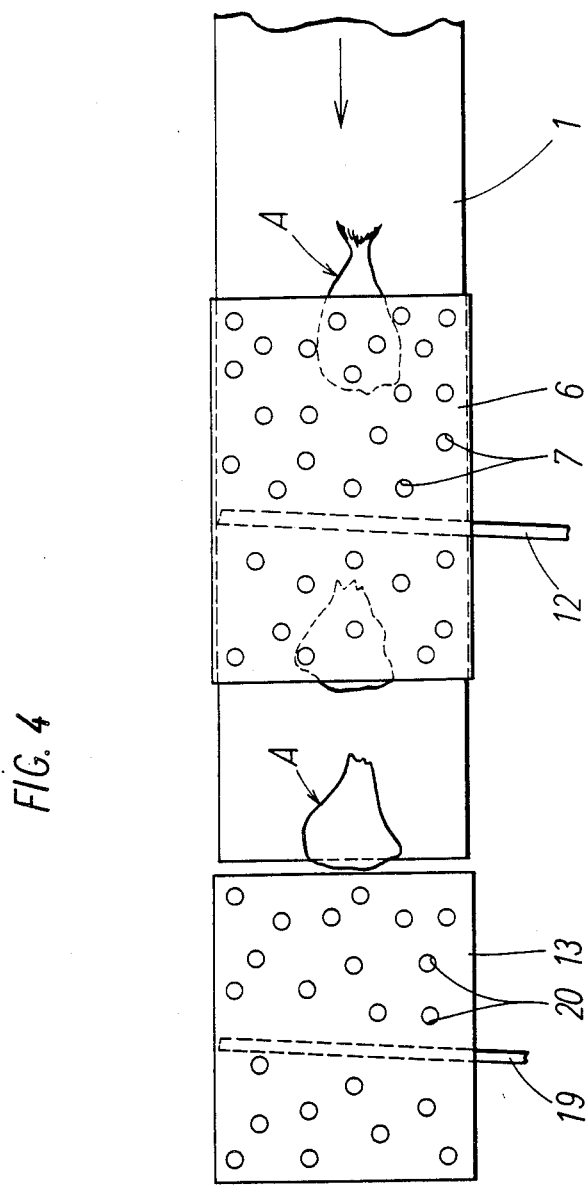
FIG. 4 is a plan view of FIG. 3.

The first flesh collecting roll 6 is in the form of a hollow steel roll which is closed at its one end, open at the other end thereof and has a multiplicity of flesh collecting holes 7 in its peripheral wall. The roll 6 is fixedly supported at the center of its closed end by the forward end of a shaft 8 rotatably mounted on the frame 2. The roll 6 is held in pressing contact with the upper side of the belt 1 at an intermediate portion thereof with respect to the direction of movement of the belt. A support member 9 fixed to the frame 2 is provided with a scraping knife 10 which is adjustingly movable longitudinally of the apparatus and which is adapted for sliding contact with the peripheral surface of the collecting roll 6 at a lower rear portion thereof. A scraper 12, which is attached to a support member 11 fixed to the frame 2, is adapted for sliding contact with the inner peripheral surface of the collecting roll 6 at the lower side thereof, over the entire length of the roll. The scraper 12 is inclined rearward from the close end of the roll 6 toward the open end thereof with respect to the axis of the roll 6 as seen in FIG. 4 so as to guide the collected flesh toward the open roll end.

At the rear end of the belt 1, i.e. at the position where the belt is passed around the drive roller 3 disposed at the terminal end of path of transport of the material, the second collecting roll 13 is held in pressing contact with the upper side of the belt. A mount 14 is provided at a rear portion of the frame 2 and is movable longitudinally of the apparatus. The second collecting roll 13 is fixedly supported, at the center of its closed end, by the free end of a shaft 15 which is rotatably supported by the mount 14. The collecting roll 13 is provided with a scraping knife 17 mounted on a support member 16 and a scraper 19 attached to a bracket 18 on the mount 14. The knife 17 and the scraper 19 are similar to those 10, 12 provided for the first roll 6 in construction and arrangement. The collecting roll 13, which is in the form of a hollow steel roll, also has a multiplicity of flesh collecting holes 20 in its peripheral wall.

The means for adjusting the pressure of contact between the first collecting roll 6 and the endless belt 1 comprises arms 23 and 24 pivotally movably attached at their base ends to opposite ends of the shafts 21 and 22 of the drive roll 3 and the driven roll 4, respectively; pressure rolls 25 and 26 supported by shafts 27 and 28 on the free ends of the arms 23, 23 and 24, 24, respectively; and hydraulic cylinders 29 and 30 mounted on the frame 2 and each having a rod connected to the end of the corresponding pressure roll shaft 27 or 28. The pressure rolls 25, 26 are pressed against the inner surface of the belt 1 at the desired pressure by advancing or retracting the rods of the cylinders 29, 30 to adjust the contact pressure of the belt 1 on the first collecting roll 6.

The means for adjusting the pressure of contact between the second collecting roll 13 and the endless belt 1 comprises a screw rod 31 inserted into a lower portion of the mount 14 in screw-thread engagement therewith and having a forward end portion which is rotatably supported by a suitable portion of the frame 2. When rotated, the screw rod 31 moves the mount 14 forward or rearward to adjust the contact pressure of the second collecting roll 13 on the belt 1.

Disposed in contact with the inner surface of the belt 1 is a belt tension roll 32 having a shaft 33, the opposite ends of which are connected to the frame 2 by screw rods 34. The tension of the belt 1 is adjustable by rotating the screw rods 34.

The two collecting rolls 6 and 13 are rotated in the direction of arrows shown by the rotation of the motor 5 through a train of gears 35.

The operation of the above embodiment will be described. First, the pressure of contact between the belt and the first and second collecting rolls 6, 13 is adjusted so that the first collecting roll 6 collects flesh of good quality and that the second collecting roll 13 collects flesh of low quality along with a small amount of remaining flesh of good quality. The motor 5 is then driven to move the belt 1 in circulation and rotate the two collecting rolls 6 and 13.

Next, pieces of fish flesh A having the skin and obtained by a filleting machine or the like are fed between the belt 1 and the first collection roll 6, with the skin side B placed on the belt 1. The flesh portion C of good quality of each piece A is collapsed or ground under pressure and with friction by the belt 1 and the roll 6 and collected in the roll through the collecting holes 7. The remaining portion of the piece A is moved forward as attached to the surface of the roll 6, scraped off the roll 6 by the scraping knife 10, placed onto the belt 1 on falling and then sent toward the second collecting roll 13.

The remaining flesh portion is fed between the belt 1 and the second collecting roll 13 and similarly ground by the belt 1 and the roll 13, with the result that flesh of low quality, D, having a small amount of flesh of good quality attached thereto is collected in the roll 13 through the holes 20.

In this way, the flesh C of good quality of fish pieces A and the flesh D of low quality are separately collected in the first roll 6 and the second roll 13, respectively. The skin B is thereafter carried forward as attached to the surface of the second roll 13 and scraped off by the knife 17, whereupon the skin falls.

The flesh portions C and D collected within the first and second rolls 6, 13 are guided toward the open ends of the rolls 6, 13 by the scrapers 12, 19 and delivered from the openings.

While the present invention has been described above with reference to the principal embodiment, the embodiment is given for illustrative purposes only. Accordingly, the invention is not limited to the embodiment but can be modified variously within the scope of the invention as defined in the appended claims.

What is claimed is:

1. An apparatus for collecting flesh of fish comprising:
    an endless belt having a conveying side for conveying the flesh of the fish;
    a first rotatable hollow roll having a peripheral wall with a plurality of flesh collecting holes therein, said first roll being generally horizontally disposed, closed at one end and open at the other end;
    a first contact pressure adjusting means for holding the conveying side of said endless belt in a selected pressing contact with a lower pressing portion of the peripheral wall of said first roll such that flesh of a high quality adjacent said first roll is collected by said first roll while lower quality flesh beneath the high quality flesh is not collected, and for holding the conveying side of said endless belt out of contact with a lower non-contact portion of said first roll downstream of said lower pressing portion below which a drop portion of said endless belt is thereby disposed;
    a second rotatable hollow roll having a peripheral wall with a plurality of flesh collecting holes therein, said second roll being generally horizontally disposed, closed at one end, and open at the other end;
    a second contact pressure adjusting means for holding the conveying side of said endless belt downstream of said first roll in a selected pressing contact with a pressing portion of the peripheral wall of said second roll such that additional flesh not collected by said first roll is collected by said second roll;

a first scraping knife disposed along the lower non-contact portion of said first roll in sliding contact with the peripheral surface of said first roll such that said first knife is located above the drop portion of said endless belt to cause flesh adhering to said first roll after pressing thereby to fall onto said drop portion of said endless belt and be conveyed to said second roll; and a second scraper knife in sliding contact with the peripheral surface of said second roll to cause flesh adhering to said second roll to be scraped therefrom.

2. An apparatus as defined in claim 1 wherein a respective scraper is so disposed as to slidingly contact an inner peripheral surface of each of said first and second collecting rolls, respectively, over the entire length of the respective said roll.

3. An apparatus as defined in claim 2 wherein each scraper is inclined rearward from the closed end of the respective collecting roll toward the open end thereof with respect to the axis of the respective collecting roll.

* * * * *